US009513792B2

(12) United States Patent
Koshi et al.

(10) Patent No.: US 9,513,792 B2
(45) Date of Patent: Dec. 6, 2016

(54) INPUT GESTURE CHART SCALING (71) Applicants: Valdrin Koshi, Paris (FR); Ernesto Mudu, Paris (FR); Ali Meziani, Herblay (FR)

(72) Inventors: Valdrin Koshi, Paris (FR); Ernesto Mudu, Paris (FR); Ali Meziani, Herblay (FR)

(73) Assignee: SAP SE, Walldorf (DE)

( * ) Notice: Subject to any disclaimer, the term of this patent is extended or adjusted under 35 U.S.C. 154(b) by 326 days.

(21) Appl. No.: 13/648,493

(22) Filed: Oct. 10, 2012

(65) Prior Publication Data

US 2014/0098020 A1    Apr. 10, 2014

(51) Int. Cl.
| | | |
|---|---|---|
| G06F 3/00 | (2006.01) |
| G06F 3/0485 | (2013.01) |
| G06F 3/01 | (2006.01) |
| G06F 3/0488 | (2013.01) |
| G06F 17/30 | (2006.01) |

(52) U.S. Cl.
CPC ............. *G06F 3/04855* (2013.01); *G06F 3/01* (2013.01); *G06F 3/0488* (2013.01); *G06F 17/30572* (2013.01)

(58) Field of Classification Search
CPC ................................ G06F 3/01; G06F 3/04855
USPC ........................................................ 345/440
See application file for complete search history.

(56) References Cited

U.S. PATENT DOCUMENTS

| | | | | |
|---|---|---|---|---|
| 5,684,508 A | * | 11/1997 | Brilman | ...................... 345/440.1 |
| 7,369,127 B1 | * | 5/2008 | Hull | ............................... 345/440 |
| 2002/0080150 A1 | * | 6/2002 | Nakatani | ........................ 345/660 |
| 2004/0002983 A1 | * | 1/2004 | Ashida et al. | ................. 707/100 |
| 2006/0125799 A1 | * | 6/2006 | Hillis et al. | .................... 345/173 |
| 2007/0136406 A1 | * | 6/2007 | Softky | .................. G06F 17/246 |
| | | | | 708/200 |
| 2010/0094548 A1 | * | 4/2010 | Tadman et al. | ............... 701/209 |
| 2011/0050702 A1 | * | 3/2011 | Heimendinger | .............. 345/440 |
| 2011/0115814 A1 | * | 5/2011 | Heimendinger et al. | ...... 345/619 |
| 2012/0229468 A1 | * | 9/2012 | Lee et al. | ...................... 345/440 |

* cited by examiner

*Primary Examiner* — Devona Faulk
*Assistant Examiner* — Hai Tao Sun
(74) *Attorney, Agent, or Firm* — Buckley, Maschoff & Talwalkar LLC (57) ABSTRACT

A system may include presentation of a visualization indicating a first plurality of dimension values and a respective function value for each of the first plurality of dimension values, the function values positioned in accordance with an initial scale of a function value axis, and the first plurality of dimension values positioned in accordance with an initial scale of a dimension value axis, detection of an input gesture to change the indicated first plurality of dimension values, and, before completion of the input gesture, determination of a second plurality of dimension values to indicate in the visualization based on the input gesture, determination of an updated scale of the function value axis based on the respective function values for each dimension value of the second plurality of dimension values, and display of the respective function values for each dimension value of the second plurality of dimension values positioned in accordance with the updated scale.

21 Claims, 11 Drawing Sheets

INPUT GESTURE CHART SCALING

BACKGROUND

A mobile computing device may display a graphical visualization of data to a user. The user may explore the data by manipulating the visualization using various commands. Some commands may be input by touching a touch screen of the device in the particular manner associated with each command.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
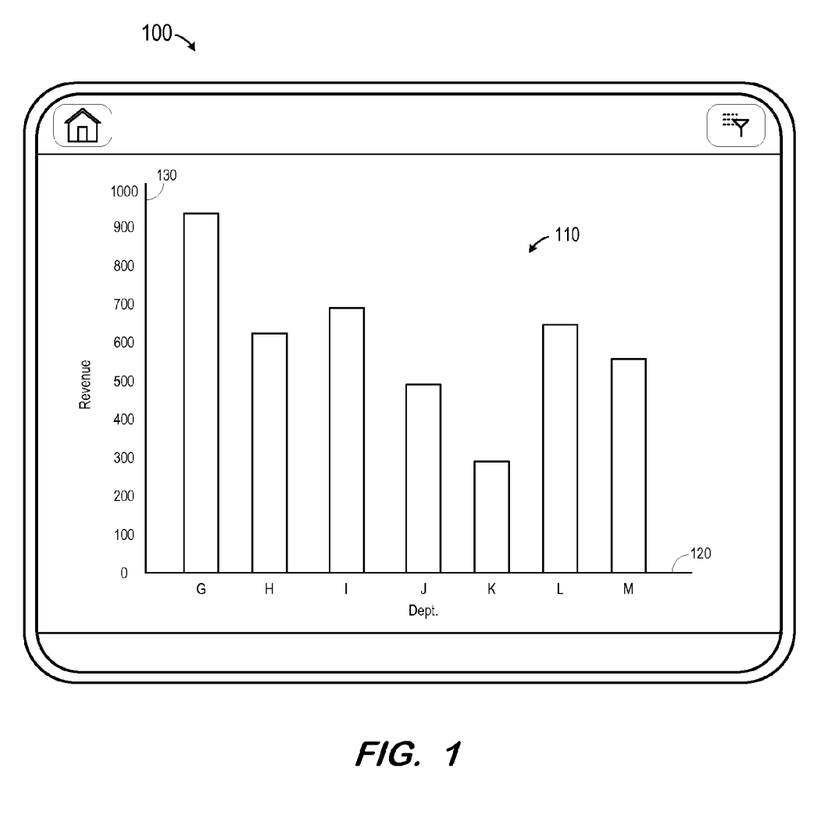
FIG. 1 is an outward view of an apparatus displaying a visualization according to some embodiments.

FIG. 1 is a perspective view of apparatus 100 according to some embodiments. Apparatus 100 may comprise a tablet computer, a smartphone, a laptop or netbook computer, and/or any other device or devices suitable to perform all or a part of the functions described herein. Apparatus 100 may include a display device to present visualizations and a touch-sensitive input surface to receive input at one or more positions of the input surface, including simultaneous input at two or more positions.

Apparatus 100 of FIG. 1 displays visualization 110. Visualization 110 may comprise any type of visualization that is or becomes known. According to some embodiments, visualization 110 graphically represents a set of data.

According to the illustrated embodiment, the represented data includes one function value for each of a plurality of dimension values. More specifically, the dimension Department ("Dept.") is represented by horizontal axis 120, and horizontal axis 120 indicates each of dimension values G through M. Each of dimension values G through M is associated with a value of the function Revenue, which is represented by vertical axis 130. The uppermost point of each vertical bar of visualization 110 indicates the function value which is associated with the dimension value listed at the bottom of the vertical bar. For example, Department "H" is associated with Revenue "600".

A function may exhibit any relation to a dimension in some embodiments. For example, for a dimension x, a function y may be expressed as y=f(x). Functions and function values as described herein may be referred to in the art as measures and measure values, respectively.

Each of axes 120 and 130 is associated with a scale. The scale determines the distribution of respective values along each axis. The dimension values and function values are therefore positioned in visualization 110 in accordance with the scales of their respective axes. Consequently, and as will be described below, a change in the scale of either axis result in a change to visualization 110, even though the underlying data does not change.

Visualization 110 is a vertical bar graph, but embodiments are not limited thereto. Non-exhaustive examples of other embodiments include horizontal bar charts, stacked bar charts, vertical or horizontal line charts, surface charts, combinations thereof, or any other type of visualization to which the processes described herein may be applied. Embodiments may also be applied to charts having two or more axes, in which more than one dimension is associated with a single axis, in which more than one function is associated with a single axis, and/or in which each axis associated with a dimension is perpendicular to each other axis associated with a dimension.

In more specific examples, a visualization may include an axis associated with the dimension "Year" and a perpendicular axis associated with the measures "Revenue" and "Margin". The perpendicular axis may, for example, represent Revenue values using a line and Margin values using bars. Alternatively, Revenue may be represented by one axis and Margin represented by another axis, with both of these axes being perpendicular to the Year axis.

Moreover, visualizations used in some embodiments may represent any type of data. Non-exhaustive examples include business data, scientific data, and economic data. This data may include any number of dimensions and functions.

Figure 2:
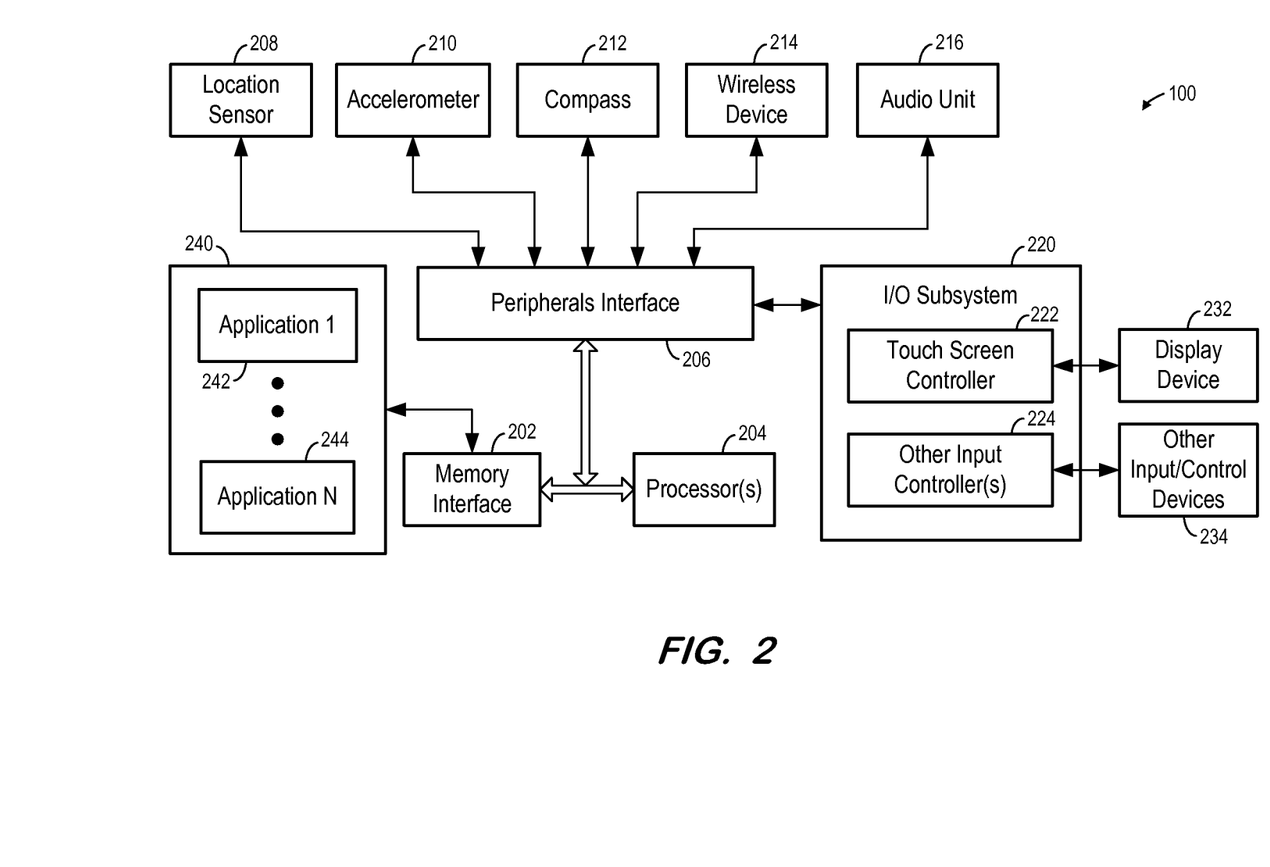
FIG. 2 is a block diagram of an architecture of an apparatus according to some embodiments.

FIG. 2 is a block diagram of an architecture of apparatus 100 according to some embodiments, and embodiments are not limited thereto. Apparatus 100 includes memory interface 202, one or more processors (e.g., microcontrollers, image processors and/or central processing units) 204, and peripherals interface 206. Memory interface 202, one or more processors 204 and/or peripherals interface 206 may comprise separate components or can be integrated within one or more integrated circuits. The various components in apparatus 200 may be coupled to one another by one or more communication buses or signal lines.

Sensors, devices and subsystems are coupled to peripherals interface 206 to facilitate multiple functionalities. For example, location sensor 208, accelerometer 210, compass 212, wireless device 214, and audio unit 216 may be provided to facilitate the collection, use and interaction with data and information and to achieve the functionality described herein.

Location sensor 208 may include circuitry and sensors for supporting a location determining capability, such as that provided by the Global Positioning System or other positioning system (e.g., systems using Wi-Fi access points, television signals, cellular grids, Uniform Resource Locators (URLs)).

Accelerometer 210 may provide information indicating movement and/or orientation of apparatus 100, as is known in the art. Compass 212 may determine an orientation of apparatus 100 with respect to compass headings and may therefore also be used to detect movement as changes in orientation.

Wireless device 214 may include one or more wireless communication subsystems, such as an 802.11b/g communication device, and/or a Bluetooth® communication device. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc.

Audio unit 216 may include a speaker and a microphone to facilitate voice-enabled functionalities, such as phone and voice mail functions. In some implementations, additional peripherals, sensors or subsystems (e.g., a camera, a photoelectric device, and a proximity sensor) may be coupled to peripherals interface 206 via connectors such as, for example a Universal Serial Bus (USB) port, or a docking port, or some other wired port connection.

I/O subsystem 220 may include touch screen controller 222 and/or other input controller(s) 224. Touch-screen controller 222 may be coupled to display device 232. Display device 232 and touch screen controller 222 may, for example, detect contact (i.e., touch input), movement (i.e., drag input) and release thereof using any of a plurality of touch-sensitivity technologies, including but not limited to capacitive, resistive, infrared, and surface acoustic wave technologies, as well as other proximity sensor arrays or other elements for determining one or more points of contact with an input surface of display device 232. Other input controller(s) 224 may be coupled to other input/control devices 234, such as one or more buttons, rocker switches, thumb-wheel, infrared port, USB port, and/or a pointer device such as a stylus.

Memory interface 202 is coupled to memory 240. Memory 240 can include high-speed random access memory and/or non-volatile memory, such as one or more magnetic disk storage devices, one or more optical storage devices, and/or flash memory (e.g., NAND, NOR). Memory 240 may store program code of application programs 242-244 which may be executed by processors 204 to cause apparatus 200 to perform the functions described herein.

Memory 240 can store an operating system, such as Android, Darwin, RTXC, LINUX, UNIX, OS X, WINDOWS, or an embedded operating system such as VxWorks. The operating system may include instructions for handling basic system services and for performing hardware dependent tasks. In some embodiments, the operating system can be a kernel (e.g., UNIX kernel). Memory 240 may also store data, including but not limited to documents, images, video files, audio files, and other data.

Figure 3:
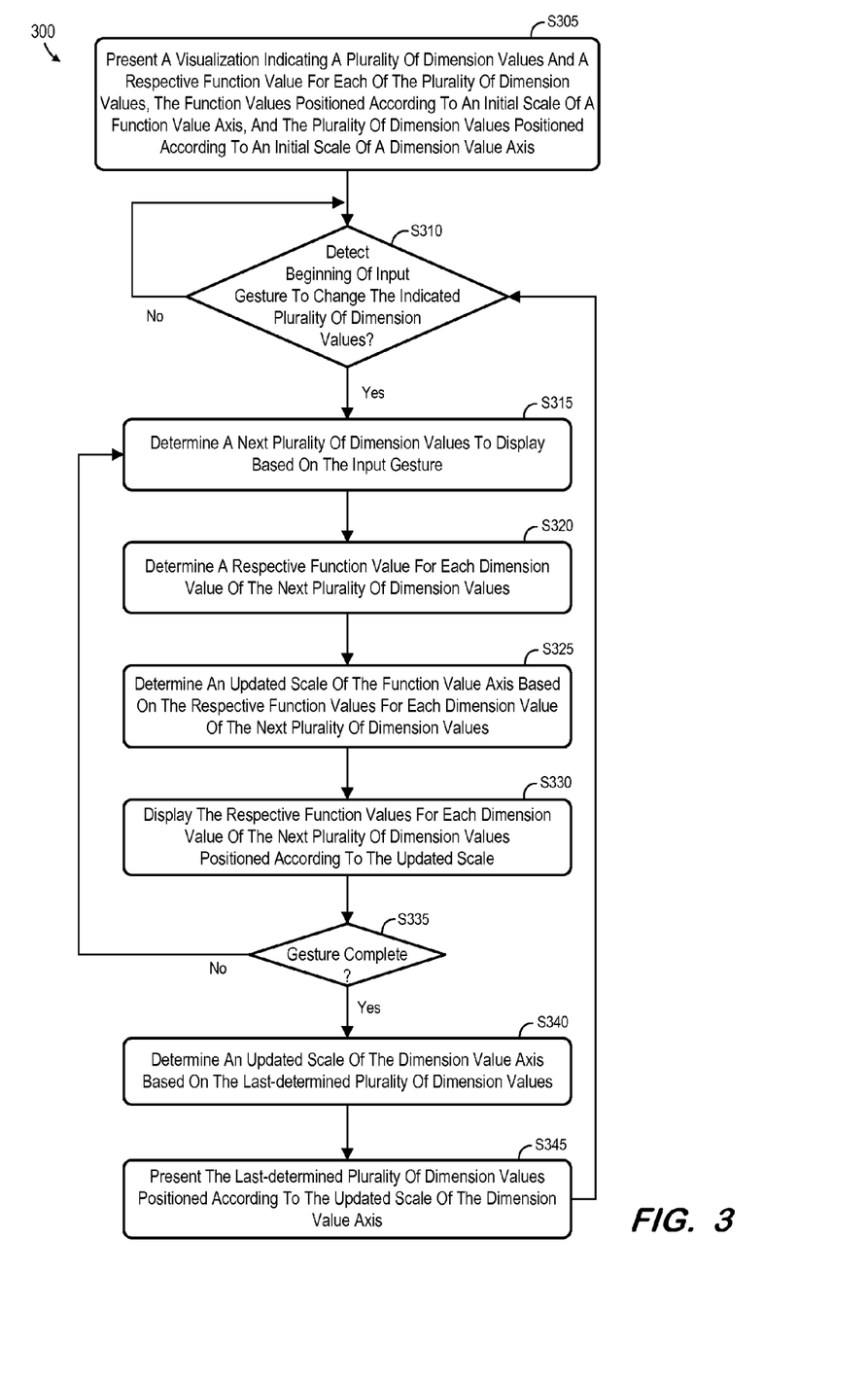
FIG. 3 is a flow diagram of a process according to some embodiments.

FIG. 3 comprises a flow diagram of process 300 according to some embodiments. Process 300 and all other processes mentioned herein may be embodied in processor-executable program code read from one or more non-transitory computer-readable media, such as a floppy disk, a CD-ROM, a DVD-ROM, a Flash drive, a fixed disk and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A visualization is presented at S305. The visualization indicates a plurality of dimension values and a respective function value for each of the plurality of dimension values. The function values are positioned in accordance with an initial scale of the function value axis, and the plurality of dimension values are positioned according to an initial scale of the dimension value axis. The visualization may comprise any visually-perceptible arrangement, and may be presented by any device suited for this purpose, including but not limited to a monitor, a touch screen, a tablet computer, a smartphone, and/or a laptop screen.

Process 300 will initially be described using the example of visualization 110. As described above, visualization 110 includes each element of the visualization to be presented at S305, but embodiments are not limited to visualization 110.

Visualization 110 may be presented by apparatus 100 in response to execution of an application (e.g., a spreadsheet application, a Web browser, a business analytics application) by a processor. The represented values may consist of any type of data that is or becomes known. In one particular example, the values members are revenue figures for different company departments. In some embodiments, apparatus 100 executes an application to retrieve the revenue figures from memory 240 and to display corresponding visualization 110 on display device 232.

Figure 4:
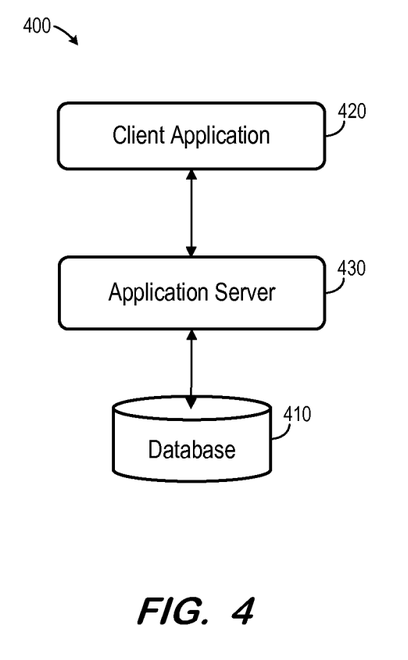
FIG. 4 is a block diagram of a system architecture according to some embodiments.

In some embodiments, the dimension values and function values may be retrieved from a remote back-end system, but embodiments are not limited thereto. FIG. 4 is a block diagram of system 400 according to some embodiments. In operation, client application 420 is executed by apparatus 100 and sends a request for revenue figures to application server 430. In response, application server 430 retrieves the requested figures and their corresponding dimension values (e.g., Department names) from database 410 and returns them to client application 420 for display.

Database 410 may comprise any one or more systems to store data. The data stored in database 410 may be received from disparate hardware and software systems, some of which are not interoperational with one another. The systems may comprise a back-end data environment employed in a business or industrial context. The data may be pushed to database 410 and/or provided in response to queries received therefrom.

In some embodiments, database 410 is implemented in Random Access Memory (e.g., cache memory for storing recently-used data) and one or more fixed disks (e.g., persistent memory for storing the full database). Alternatively, database 410 may implement an "in-memory" database, in which volatile (e.g., non-disk-based) memory (e.g., Random Access Memory) is used both for cache memory and for storing the full database. In some embodiments, the data of the full database may comprise one or more of conventional tabular data, row-based data, column-based data, and object-based data. Database 410 may also or alternatively support multi-tenancy by providing multiple logical database systems which are programmatically isolated from one another. Moreover, the data of database 410 may be indexed and/or selectively replicated in an index.

According to some embodiments, database 410 executes a database server process to provide data to database applications. More specifically, database 410 may communicate with one or more database applications executed by application server 430 over one or more interfaces (e.g., a Structured Query Language (SQL)-based interface) in order to provide data thereto.

Application server 430 may execute database applications to provide, for example, business reporting, inventory control, online shopping, and/or any other suitable functions. The database applications may, in turn, support client applications executed by end-user devices (e.g., desktop computers, laptop computers, tablet computers, smartphones, etc.). Such a client application may comprise a rich client application, an applet in a Web browser, or any other application to access and display interfaces generated by a database application.

Returning to process 300, flow pauses at S310 to await detection of the beginning of an input gesture intended to change the plurality of dimension values indicated by the visualization. The input gesture may include any input command for changing the dimension values indicated by visualization 110. The change may include adding one or more dimension values to visualization 110, subtracting one or more dimension values from visualization 110, or adding one or more dimensions values and also subtracting one or more dimension values.

The input gesture may be input using a keyboard, a mouse, a stylus, a finger, or any other device. The input gesture may be input to a touch screen of apparatus 100, to a touch pad, or elsewhere. Since a "beginning" of the input gesture is detected at S310, it will be assumed that the input gesture is also associated with an "end", and that portions of process 300 are executed between the beginning and the end of the input gesture.

Figure 5:
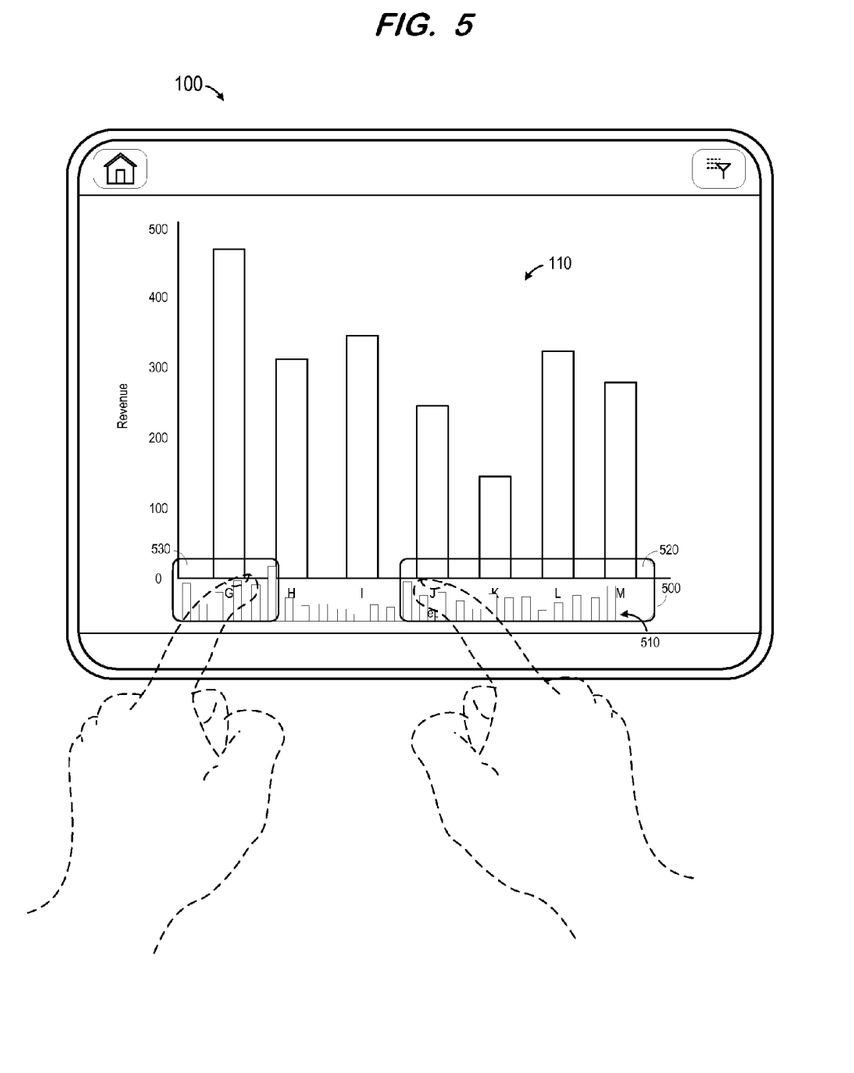
FIG. 5 is an outward view of an apparatus displaying graphical representations according to some embodiments.
Figure 6:
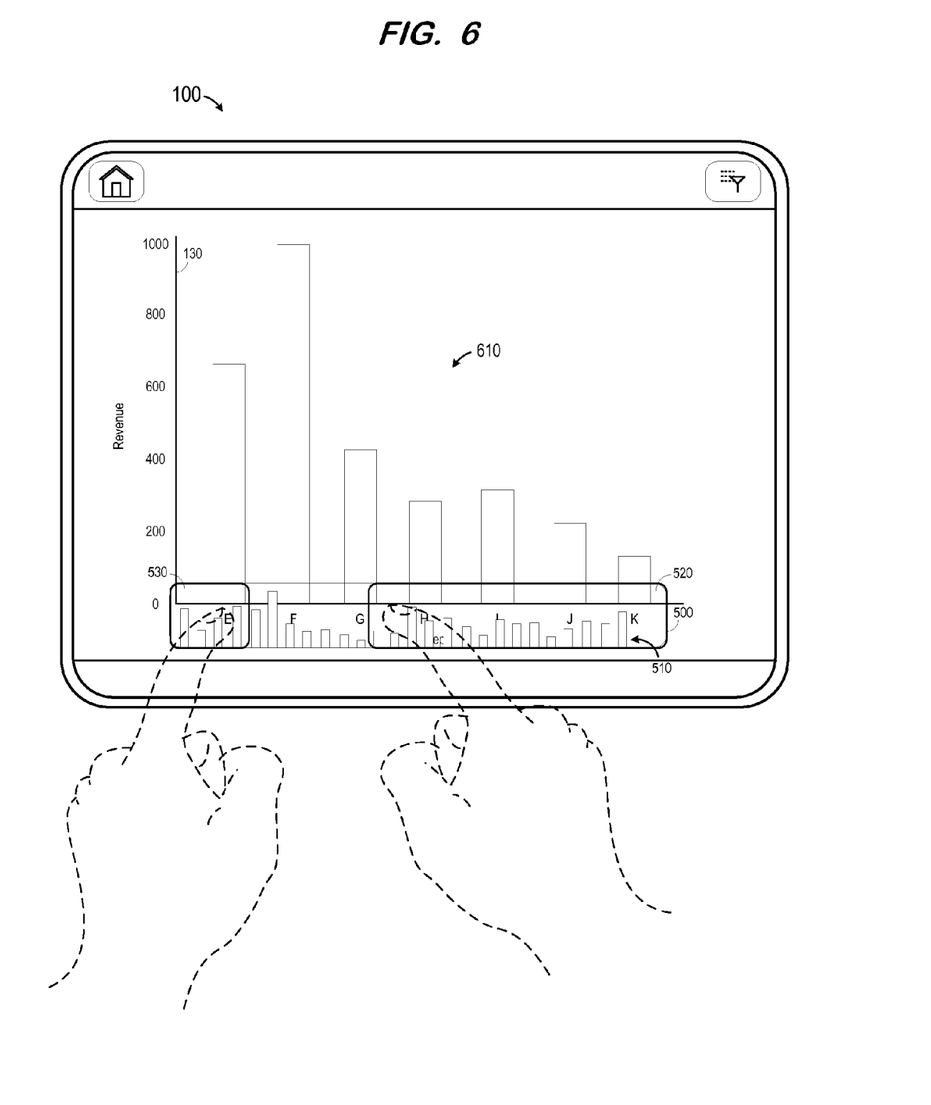
FIGS. 6 through 8 illustrate a gesture and corresponding visualizations according to some embodiments.

FIGS. 5 and 6 illustrate an example of detection at S310 according to some embodiments. FIG. 5 shows that the user has invoked overview graphic 500, which includes a view of master visualization 510. Overview graphic 500 may be invoked by any input technique that is or becomes known. In some embodiments, the user touches any portion of visualization 110 to invoke overview graphic 500.

Visualization 110 is a portion of master visualization 510. More specifically, visualization 110 is the portion of master visualization 510 that is not covered by control 520 and control 530 of overview graphic 500. According to the illustrated example, control 520 and control 530 may be manipulated through input gestures to change the plurality of dimension values indicated by visualization 110. Embodiments are not limited to any particular input gestures for changing the plurality of indicated dimension values. In one non-exhaustive example, the input gestures may be input upon visualization 110 itself, without use of graphical device such as master visualization 510.

Next, in FIG. 6, the user has moved his fingers while keeping them in contact with the touch screen in order to shrink control 530 to the left and to expand control 520 leftward. This movement is detected as the beginning of a gesture at S310. Accordingly, flow proceeds to S315.

A next plurality of dimension values to display is determined at S315 based on the input gesture. The next plurality of dimension values is determined before completion of the input gesture. With respect to the FIG. 6 example, the next plurality of dimension values to display are determined to be those dimension values of master visualization 510 which are not covered by control 520 or 530. The next plurality of dimension values does not include the two right-most dimension values of visualization 110 of FIG. 5, and includes two new dimension values which were previously to the left of the dimension values of FIG. 5 in master visualization 510. Accordingly, the input gesture to this point is a "pan" gesture.

A respective function value is determined for each of the next plurality of dimension values at S320. These function values may be determined from data used to create master visualization 510 or by requesting the function values in a similar manner as performed to create visualization 110. Again, S320 is performed before completion of the input gesture.

At S325, an updated scale of the function value axis is determined based on the respective function values determined at S320. The updated scale may conform to the range of the determined function values better than the initial scale. For example, one of the determined function values may be too large to display in accordance with the initial scale. Alternatively, the determined values may each be smaller than the smallest label of the initial scale, so using the initial scale might fail to properly emphasize differences in the function values.

According to some embodiments, the updated scale is equal to the difference between the maximum determined function value and the minimum determined function value, divided by the length of the associated axis.

The respective function values for each of the new dimension values are then displayed at S330, positioned in accordance with the updated scale. FIG. 6 illustrates such a display of new visualization 610, which includes only those dimension values determined at S315. The range of axis 130 extends to "1000" whereas the initial range extended only to "500". This extended range allows proper indication of the function value associated with dimension value "F", which is well above "500".

S315, S320, S325 and S330 occur during execution of the gesture. Accordingly, it is determined whether the gesture is complete at S335. For the present example, it will be assumed that the gesture is not yet complete so flow returns to S315.

Figure 7:
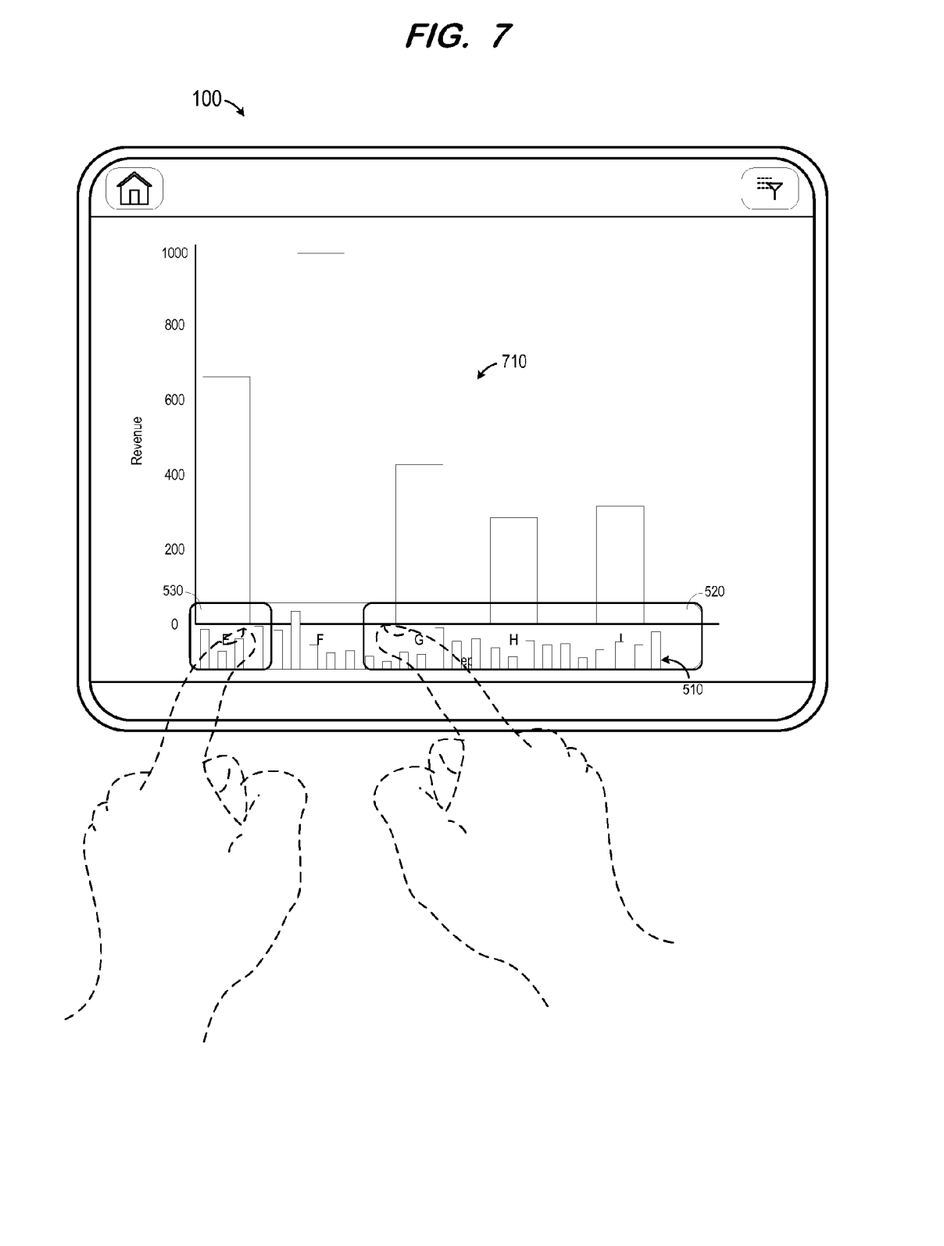

A next plurality of dimension values to display is determined at S315 based on the current state of the gesture. For example, as shown in FIG. 7, the user has maintained the position and size of control 530 and continued to expand control 520 leftward. Again, the next plurality of dimension values to display are determined to be those dimension values of master visualization 510 which are not covered by control 520 or 530. As shown, the determined next plurality of dimension values does not include the two right-most dimension values of visualization 610 of FIG. 6. Accordingly, this portion of the input gesture may be considered a "zoom-in" gesture.

A respective function value is determined for each of the next plurality of dimension values at S320 as described above. At S325, an updated scale of the function value axis is determined based on the determined respective function values. The respective function values for each of the new dimension values are then displayed at S330, positioned in accordance with the updated scale. As shown in FIG. 7, the updated scale of visualization 710 is identical to that of FIG. 6.

It will be assumed that the input gesture is now complete, and that flow therefore continues to S340 from S335. Completion of the input gesture may consist of removing one or both fingers from the touch screen, failing to move the fingers for a period of time, or any other indication. At S340, an updated scale of the dimension value axis is determined based on the last-determined plurality of dimension values.

The updated scale may be determined so as to ensure inclusion of all partially-displayed ones of the last-determined dimension values and to center the last-determined plurality of dimension values in the resulting visualization. In this regard, the last-determined dimension values are presented at S345 positioned in accordance with the updated scale determined at S340.

Figure 8:
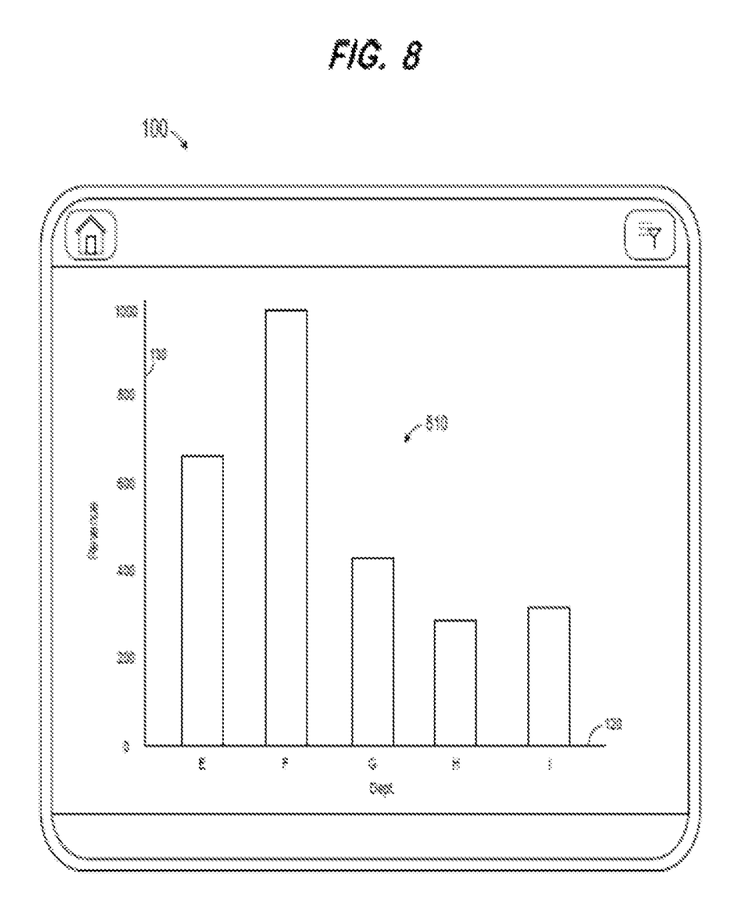

FIG. 8 shows resulting visualization 810 according to the present example. Visualization 810 is identical to visualization 710 except that the scale of axis 120, and the resulting positions of the indicated dimension values, has been changed to center the elements of visualization 810. As shown, the scale of axis 130 remains as it was last updated.

Flow may return from S345 to S310 to await another input gesture to change the indicated dimension values of visualization 810.

Figure 9:
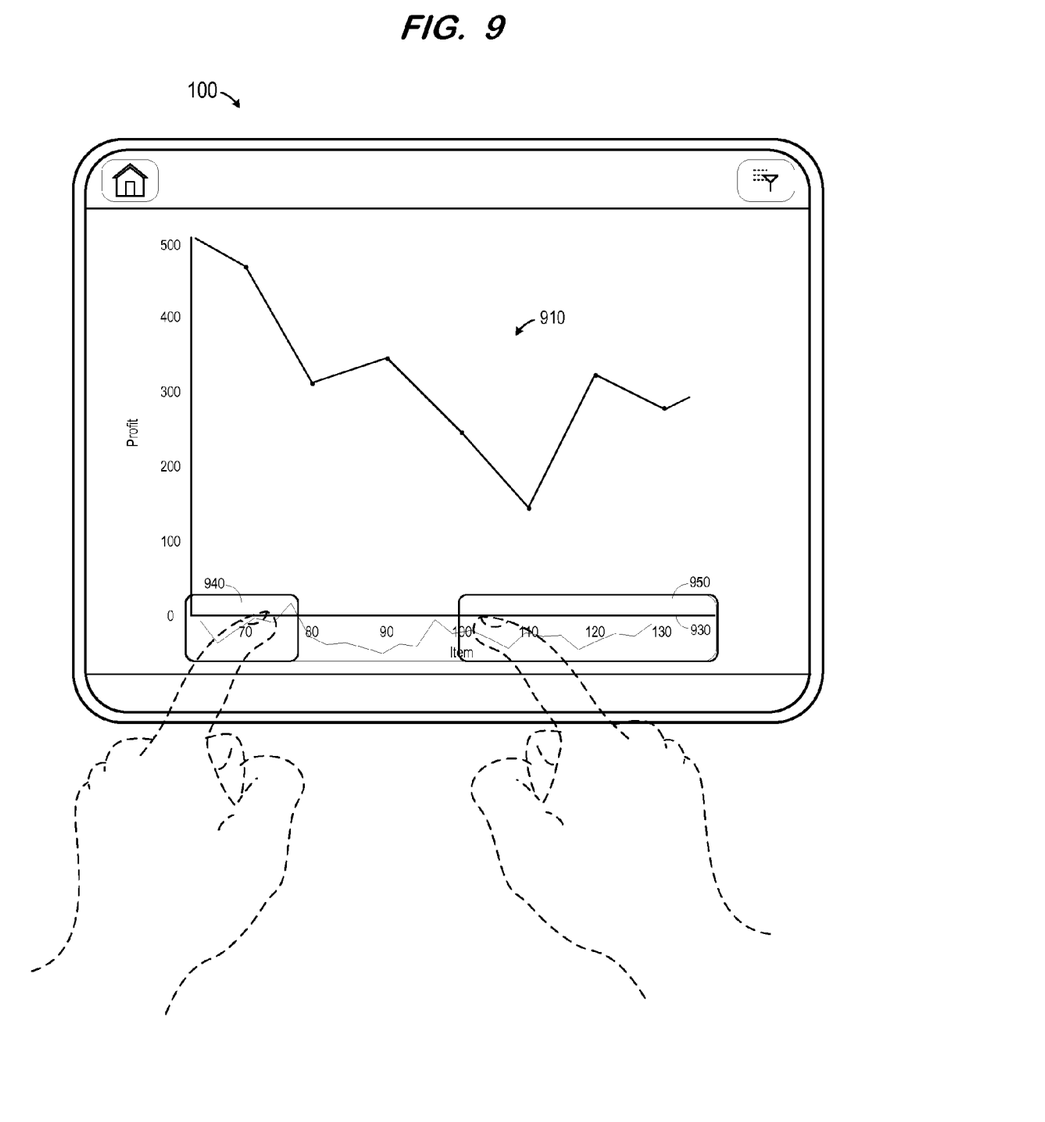
FIGS. 9 through 11 illustrate a gesture and corresponding visualizations according to some embodiments.
Figure 10:
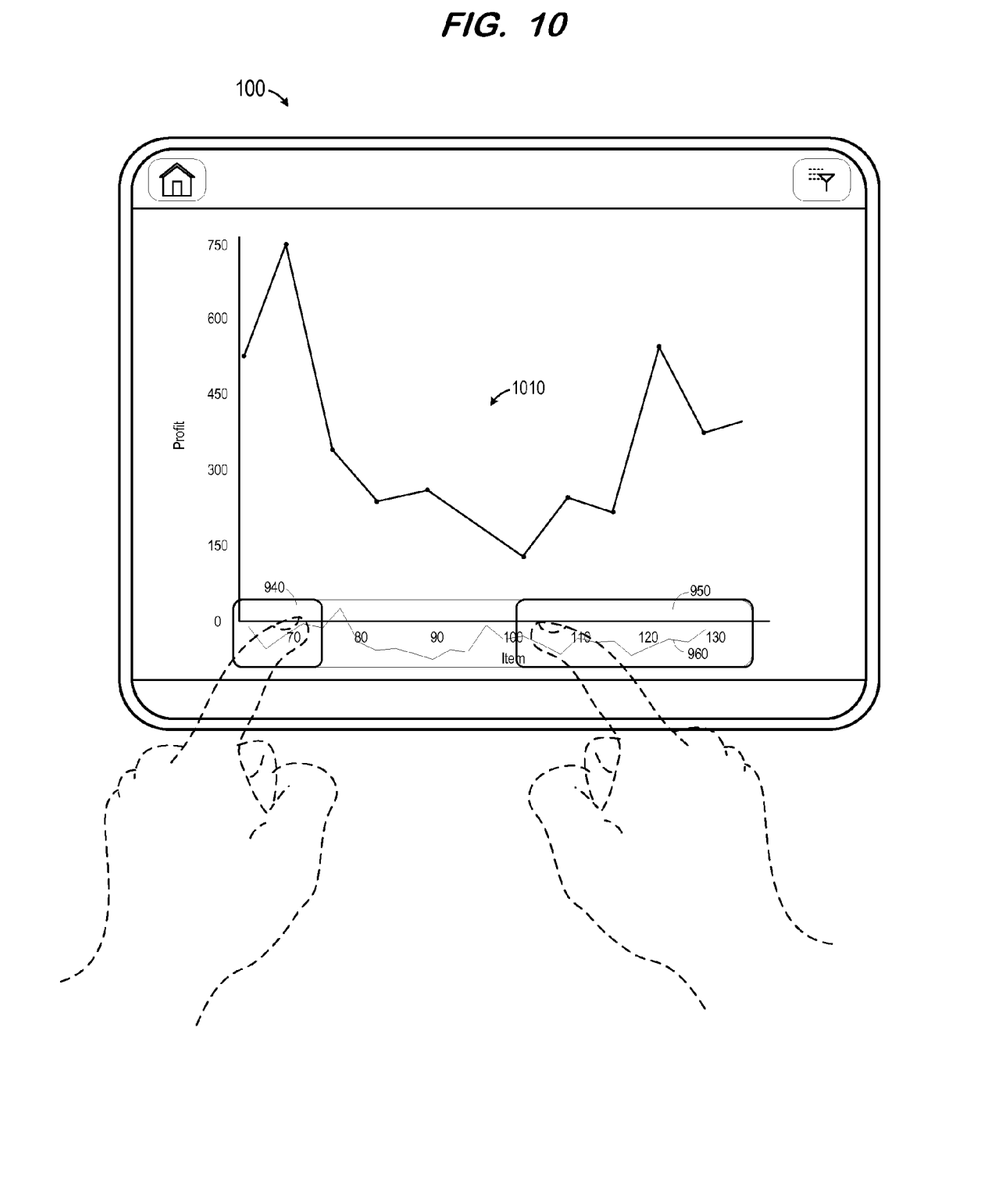
Figure 11:
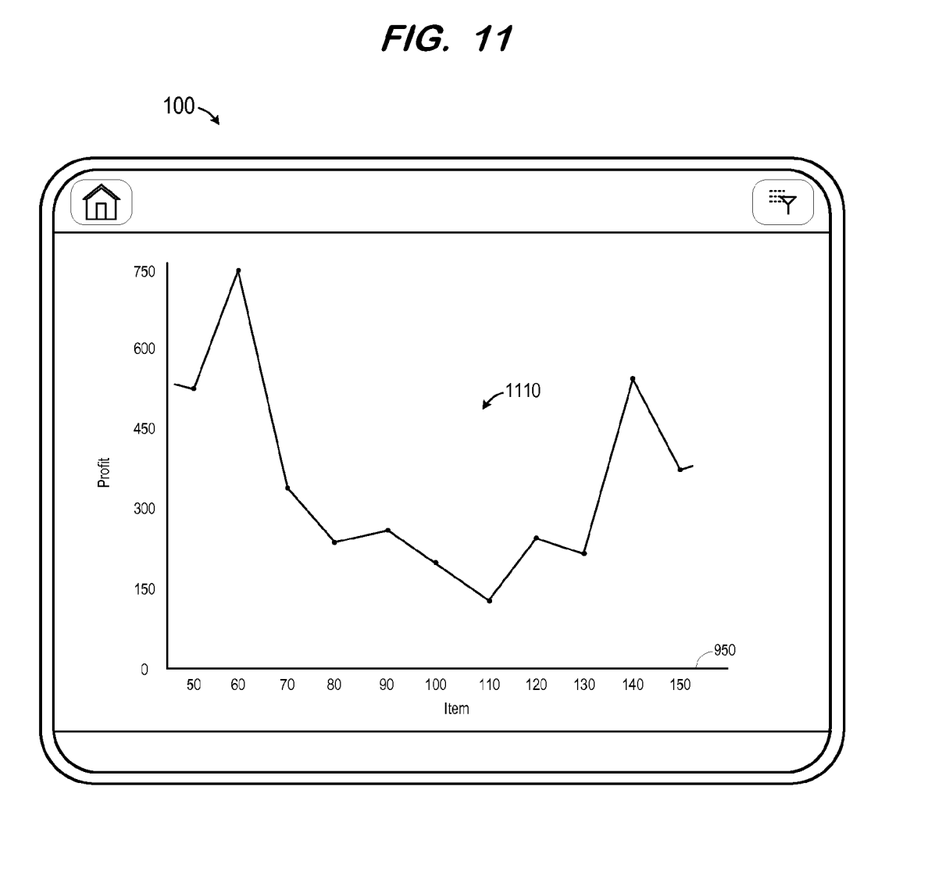

FIGS. 9 through 11 illustrate execution of process 300 with respect to a horizontal line chart. Visualization 910 of FIG. 9 indicates a plurality of values of the dimension Item and a respective value of function Profit for each of the plurality of dimension values. The function values are positioned in accordance with an initial scale of function value axis 920, and the plurality of dimension values are positioned according to an initial scale of dimension value access 930.

FIG. 9 shows the beginning of an input gesture detected at S310. The user has touched areas of the screen corresponding to controls 940 and 950. FIG. 10 illustrates continuance of this input gesture, in which the user has shrunken control 940 leftward and control 950 rightward. Accordingly, at S315, a next plurality of dimension values to display are determined based on the input gesture.

The determined dimension values are those dimension values of master visualization 960 which are not covered by control 940 or 950. As shown, the determined next plurality of dimension values includes the initial dimension values of visualization 910, as well as additional dimension values. Accordingly, this portion of the input gesture may be considered a "zoom-out" gesture.

A respective function value is determined for each of the next plurality of dimension values at S320 as described above. At S325, an updated scale of the function value axis is determined based on the determined respective function values. The respective function values for each of the new dimension values are then displayed at S330, positioned in accordance with the updated scale. As shown in FIG. 10, the updated scale of visualization 1010 is different from that of visualization 910.

It will be assumed that the input gesture is now complete. Therefore, at S340, an updated scale of the dimension value axis is determined based on the last-determined plurality of dimension values.

The updated scale may be determined so as to ensure inclusion of all partially-displayed ones of the last-determined dimension values and to center the last-determined plurality of dimension values in the resulting visualization. In this regard, the last-determined dimension values are presented at S345 positioned in accordance with the updated scale determined at S340.

FIG. 11 shows resulting visualization 1110 according to the present example. Visualization 1110 is slightly rightward-shifted compared to visualization 1010 so as to center the data points of visualization 1110. Visualization 1110 also shows a denser scale along dimension value axis 930 than shown in FIG. 9, as would be expected from a "zoom-out" operation. As explained above, flow may return from S345 to S310 to await another input gesture to change the indicated dimension values of visualization 1110.

The embodiments described herein are solely for the purpose of illustration. Those in the art will recognize other embodiments may be practiced with modifications and alterations limited only by the claims.

What is claimed is:

1. An apparatus to retrieve data from a relational database, wherein the data includes one or more database dimensions, one or more database dimension values and one or more function values, and wherein the one or more database dimensions are database groups into which the data are organized, the one or more database dimension values are elements of which a respective database dimension is composed, and the one or more function values are related to a measure of a respective database dimension, the apparatus comprising:
a display device; and
a processor to execute program code to cause the apparatus to:
present, using the display device, a visualization indicating a first plurality of database dimension values and a respective function value for each of the first plurality of database dimension values, the function values positioned in accordance with an initial scale of a function value axis, and the first plurality of database dimension values positioned in accordance with an initial scale of a database dimension value axis;
detect initiation of an input gesture to change the visualization of the indicated first plurality of database dimension values by at least one of adding a first one or more database dimension values to the visualization by displaying the added first one or more database dimension values along the database dimension value axis and removing a second one or more database dimension values from the visualization by removing the second one or more database dimension values from the database dimension value axis, wherein the added database dimension value is not one of the first plurality of database dimension values;
before completion of the input gesture, determine a second plurality of database dimension values to indicate in the visualization based on the input gesture;
before completion of the input gesture, determine an updated scale of the function value axis based on the respective function values for each database dimension value of the second plurality of database dimension values; and
before completion of the input gesture, display the respective function values for each database dimension value of the second plurality of database dimension values positioned in accordance with the updated scale.

2. The apparatus according to claim 1, the processor further to execute program code to cause the apparatus to:
determine that the input gesture is complete;
determine an updated scale of the database dimension value axis based on the second plurality of database dimension values; and
present the second plurality of database dimension values positioned in accordance with the updated scale of the database dimension value axis.

3. The apparatus according to claim 1, the processor further to execute program code to cause the apparatus to:
before completion of the input gesture, determine a third plurality of database dimension values to indicate in the visualization based on the input gesture;
before completion of the input gesture, determine a second updated scale of the function value axis based on the respective function values for each database dimension value of the third plurality of database dimension values; and
before completion of the input gesture, display the respective function values for each database dimension value of the third plurality of database dimension values positioned in accordance with the second updated scale.

4. The apparatus according to claim 3, the processor further to execute program code to cause the apparatus to:
determine that the input gesture is complete;

determine an updated scale of the database dimension value axis based on the second plurality of database dimension values; and present the second plurality of database dimension values positioned in accordance with the updated scale of the database dimension value axis.

5. The apparatus according to claim 1, wherein the input gesture is a panning gesture, and wherein the second plurality of database dimension values includes one or more of the first plurality of database dimension values and one or more other database dimension values.

6. The apparatus according to claim 1, wherein the input gesture is a zoom-in gesture, and wherein the second plurality of database dimension values includes only one or more, but less than all, of the first plurality of database dimension values.

7. The apparatus according to claim 1, wherein the input gesture is a zoom-out gesture, and wherein the second plurality of database dimension values includes only all of the first plurality of database dimension values and one or more other database dimension values.

8. A non-transitory computer-readable medium having program code stored thereon, the program code executable by a processor to cause an apparatus to retrieve data from a relational database, wherein the data includes one or more database dimensions, one or more database dimension values and one or more function values, and wherein the one or more database dimensions are database groups into which the data are organized, the one or more database dimension values are elements of which a respective database dimension is composed, and the one or more function values are related to a measure of a respective database dimension, the program code executable by the processor to cause the apparatus to:

present a visualization indicating a first plurality of database dimension values and a respective function value for each of the first plurality of database dimension values, the function values positioned in accordance with an initial scale of a function value axis, and the first plurality of database dimension values positioned in accordance with an initial scale of a database dimension value axis;

detect initiation of an input gesture to change the visualization of the indicated first plurality of database dimension values by at least one of adding a first one or more database dimension values to the visualization by displaying the added first one or more database dimension values along the database dimension value axis and removing a second one or more database dimension values from the visualization by removing the second one or more database dimension values from the database dimension value axis, wherein the added database dimension value is not one of the first plurality of database dimension values;

before completion of the input gesture, determine a second plurality of database dimension values to indicate in the visualization based on the input gesture;

before completion of the input gesture, determine an updated scale of the function value axis based on the respective function values for each database dimension value of the second plurality of database dimension values; and before completion of the input gesture, display the respective function values for each database dimension value of the second plurality of database dimension values positioned in accordance with the updated scale.

9. The medium according to claim 8, the program code further executable by a processor to cause an apparatus to:

determine that the input gesture is complete;

determine an updated scale of the database dimension value axis based on the second plurality of database dimension values; and present the second plurality of database dimension values positioned in accordance with the updated scale of the database dimension value axis.

10. The medium according to claim 8, the program code further executable by a processor to cause an apparatus to:

before completion of the input gesture, determine a third plurality of database dimension values to indicate in the visualization based on the input gesture;

before completion of the input gesture, determine a second updated scale of the function value axis based on the respective function values for each database dimension value of the third plurality of database dimension values; and before completion of the input gesture, display the respective function values for each database dimension value of the third plurality of database dimension values positioned in accordance with the second updated scale.

11. The medium according to claim 10, the program code further executable by a processor to cause an apparatus to:

determine that the input gesture is complete;

determine an updated scale of the database dimension value axis based on the second plurality of database dimension values; and present the second plurality of database dimension values positioned in accordance with the updated scale of the database dimension value axis.

12. The medium according to claim 8, wherein the input gesture is a panning gesture, and wherein the second plurality of database dimension values includes one or more of the first plurality of database dimension values and one or more other database dimension values.

13. The medium according to claim 8, wherein the input gesture is a zoom-in gesture, and wherein the second plurality of database dimension values includes only one or more, but less than all, of the first plurality of database dimension values.

14. The medium according to claim 8, wherein the input gesture is a zoom-out gesture, and wherein the second plurality of database dimension values includes only all of the first plurality of database dimension values and one or more other database dimension values.

15. A method implemented by a computing system in response to execution of program code by a processor of the computing system to retrieve data from a relational database, wherein the data includes one or more database dimensions, one or more database dimension values and one or more function values, and wherein the one or more database dimensions are database groups into which the data are organized, the one or more database dimension values are elements of which a respective database dimension is composed, and the one or more function values are related to a measure of a respective database dimension, the method comprising:

presenting a visualization indicating a first plurality of database dimension values and a respective function value for each of the first plurality of database dimension values, the function values positioned in accordance with an initial scale of a function value axis, and the first plurality of database dimension values positioned in accordance with an initial scale of a database dimension value axis;

detecting initiation of an input gesture to change the visualization of the indicated first plurality of database dimension values by at least one of adding a first one or more database dimension values to the visualization by displaying the added first one or more database dimension values along the database dimension value axis and removing a second one or more database dimension values from the visualization by removing the second one or more database dimension values from the database dimension value axis, wherein the added database dimension value is not one of the first plurality of database dimension values;

before completion of the input gesture, determining a second plurality of database dimension values to indicate in the visualization based on the input gesture;

before completion of the input gesture, determining an updated scale of the function value axis based on the respective function values for each database dimension value of the second plurality of database dimension values; and before completion of the input gesture, displaying the respective function values for each database dimension value of the second plurality of database dimension values positioned in accordance with the updated scale.

16. The method according to claim 15, further comprising:

determining that the input gesture is complete;

determining an updated scale of the database dimension value axis based on the second plurality of database dimension values; and presenting the second plurality of database dimension values positioned in accordance with the updated scale of the database dimension value axis.

17. The method according to claim 15, further comprising:

before completion of the input gesture, determining a third plurality of database dimension values to indicate in the visualization based on the input gesture;

before completion of the input gesture, determining a second updated scale of the function value axis based on the respective function values for each database dimension value of the third plurality of database dimension values; and before completion of the input gesture, displaying the respective function values for each database dimension value of the third plurality of database dimension values positioned in accordance with the second updated scale.

18. The method according to claim 17, further comprising:

determining that the input gesture is complete;

determining an updated scale of the database dimension value axis based on the second plurality of database dimension values; and presenting the second plurality of database dimension values positioned in accordance with the updated scale of the database dimension value axis.

19. The method according to claim 15, wherein the input gesture is a zoom-in gesture, and wherein the second plurality of database dimension values includes only one or more, but less than all, of the first plurality of database dimension values.

20. The method according to claim 15, wherein the input gesture is a zoom-out gesture, and wherein the second plurality of database dimension values includes only all of the first plurality of database dimension values and one or more other database dimension values.

21. The apparatus of claim 1, wherein the visualization includes a master visualization section including the dimension values available for addition and subtraction in the visualization.

* * * * *